Patented Dec. 18, 1928.

1,695,447

UNITED STATES PATENT OFFICE.

JOHN C. WOODRUFF, GROVER BLOOMFIELD, AND WILLIAM J. BANNISTER, OF TERRE HAUTE, INDIANA, ASSIGNORS TO COMMERCIAL SOLVENTS CORPORATION, OF TERRE HAUTE, INDIANA, A CORPORATION OF MARYLAND.

CATALYST FOR SYNTHETIC METHANOL PRODUCTION.

No Drawing.   Application filed October 25, 1926. Serial No. 144,165.

Our invention relates to the production of methanol by the high pressure catalytic combination of oxides of carbon with hydrogen, and pertains more directly to the preparation of improved catalysts and their use in the process.

Methanol may be produced by combining oxides of carbon with hydrogen in the presence of a suitable catalyst at elevated temperature and pressure. Carbon monoxide, carbon dioxide, and mixtures of the two oxides may be employed, these substances reacting with hydrogen according to the following equations:—

I. carbon monoxide— $CO + 2H_2 = CH_3OH$
II. carbon dioxide— $CO_2 + 3H_2 = CH_3OH + H_2O$ It is observed that when carbon dioxide is the oxide employed, one molecule of water is formed for every molecule of methanol produced. On the other hand when pure carbon monoxide is used, theoretically there is nothing produced by the reaction but methanol. Actually in practice pure carbon monoxide and pure carbon dioxide are both difficult to obtain economically, so that the methanol synthesis is frequently carried out by reacting a mixture of carbon monoxide and carbon dioxide with hydrogen.

The production of methanol by the interaction of hydrogen and carbon oxides is essentially a hydrogenating reaction effected by hydrogenating catalysts. While the methanol reaction is ordinarily represented according to Equations I and II above, it is probable that there is an intermediate reaction and that this reaction may involve the production of formaldehyde which is afterwards further hydrogenated to methanol, thus:—

III. $CO + 2H_2 = CH_2O + H_2 = CH_3OH$

In the case of carbon dioxide, the first reaction occurring is, probably the reduction of that material to carbon monoxide, and Equation II may thus be expanded as follows:—

IV. $CO_2 + H_2 = H_2O + CO$
$CO + 2H_2 = CH_2O + H_2 = CH_3OH$

Under certain conditions no methanol is produced by the high pressure catalytic reaction of hydrogen and carbon monoxide—only methane being formed. This reaction is illustrated by the following equation:—

V. $CO + 3H_2 = CH_4 + H_2O$

It is, of course, certain that Equation V represents a summation of several intermediate reactions. It represents the complete hydrogenation of carbon oxide.

A possible course of reaction is indicated below.

VI. $CO + H_2 = CH_2O$
$CH_2O + H_2 = CH_3OH$
$CH_3OH + H_2 = CH_4 + H_2O$

In addition to the methane reaction there are other side-reactions which sometimes occur in which there are produced esters, aldehydes, organic acids, ketones, and hydrocarbons other than methane; these reactions occurring as the result of the polymerization or condensation of methanol or its decomposition products.

When a gas mixture comprising carbon oxides mixed with an excess of hydrogen over the amount theoretically required to produce methanol is passed over a catalytic substance consisting of metals or their oxides at a pressure above 50 atmospheres and at a temperature above 250° C. there is nearly always produced some reaction between the gaseous components. The extent of this reaction depends to some degree on space velocity, temperature, and pressure, but the fact remains that under the conditions outlined, carbon oxides and hydrogen react to some extent in all cases.

The substances formed by such a process depend, both as to identity and as to amount, almost entirely on the nature and activity of the catalytic substance present. The methanol catalysts mentioned in prior patents and literature are combinations of metals or their oxides which substances normally exert a hydrogenating catalytic effect on gas reactions.

The literature on the high pressure catalytic process for synthesizing methanol states that the presence of nickel or any of its compounds in a catalyst destroys or poisons the catalyst and tends to inhibit methanol formation. While reduced nickel is an excellent hydrogenating catalyst for many reactions, it has been reported to react with carbon monoxide, and with mixtures of hydrogen and the carbon oxides (i. e. carbon monoxide and/or carbon dioxide) used in the methanol reaction, forming a volatile carbonyl compound which, it has been stated, inhibits the methanol reaction. The normal effect of the presence of nickel in a methanol catalyst according to present theories is to cause the reaction of hydrogen and carbon oxides to produce mainly methane and water.

We have now discovered a method of employing nickel as a methanol catalyst whereby the desirable hydrogenating catalytic effect productive of methanol is obtained and the tendency to methane formation is inhibited. Briefly, our nickel catalyst comprises granules of nickel, per se, prepared by reducing nickel compounds with hydrogen at an elevated temperature.

We have discovered that a nickel catalyst of this type is suitable for use in the high-pressure synthesis of methanol, all of the prior art literature notwithstanding. We attribute the lack of success of prior efforts to employ nickel catalysts in the synthetic methanol reaction to the character and to the degree of catalytic activity of the nickel catalyst employed. According to our own experiments, ordinary nickel catalysts such as have been employed in other similar chemical processes are not suitable for synthetic methanol production. We have discovered, however, that reduced nickel, prepared by the treatment with hydrogen at elevated temperature of reducible compounds of nickel such as the hydrate, the oxide, the nitrate, or various organic salts such as the oxalate or tartrate, may form a very valuable catalyst for synthetic methanol production.

In prior attempts to adapt nickel catalysts to synthetic methanol production a catalyst of high activity has apparently been employed and the result attained has merely been the complete hydrogenation of carbon monoxide to methane, as was indicated in Equations V and VI. The nickel catalysts which were found valueless in prior art tests were composed of nickel or nickel oxide in admixture with an inert support or in admixture with another catalytic oxide. In case the catalyst initially contained nickel oxide, it would, of course, be largely reduced to metallic nickel, either prior to or during use. It is a fact well-established in the catalytic hydrogenation art that nickel reduced while in admixture with an inert supporting mass is a more active catalyst than is the identical nickel compound when reduced at the same temperature in the absence of a supporting medium. It is also well-known that a reduction temperature above 300° C., all other things being equal, produces a less active nickel catalyst than does a lower temperature. We have found, however, that a granular reduced nickel catalyst prepared by the reduction of nickel compound, per se, may satisfactorily serve as a methanol catalyst, provided the proper degree of activity is imparted during the reduction.

Nickel reduced at temperatures in excess of 950° C. has little or no catalytic effect in the synthetic methanol reaction. We attribute this fact to the character of the nickel. Reduced at so high a temperature it is too inactive a catalyst. Nickel reduced at temperatures below 300° C. is so active a catalyst that its effect in the synthetic methanol reaction is to completely hydrogenate carbon monoxide and thus to produce only methane. We have discovered that nickel catalysts produced by the reduction of nickel compounds within a temperature range of 300–950° C. may be employed in the synthetic methanol reaction. We have further discovered that nickel reduced within a temperature range of 500–600° C. is the best synthetic methanol catalyst.

In the tabulation below we have shown the results attained in the synthetic methanol process with our nickel catalysts. The process was carried out by passing a mixture of hydrogen and carbon oxide through 10 c. c. of granular nickel catalyst under the pressures and at the temperatures indicated, the methanol being recovered by cooling the reacted gases and condensing under pressure. The per cent methanol in the condensate is reported and it should be understood that the residual per cent of condensate in all cases was water.

| Reduction of catalyst (°C.) | Reaction temp. | Reaction pressure in pounds per square inch | Space velocity of gases | c. c. condensate per hour | Per cent methanol | Per cent carbon monoxide in gas |
|---|---|---|---|---|---|---|
| 300 | 400 | 3000 | 10,000 | 1.3 | 51.0 | 16.5 |
| 300 | 400 | 3000 | 20,000 | 2.2 | 47.5 | 16.5 |
| 300 | 400 | 3000 | 40,000 | 3.4 | 43.7 | 16.5 |
| 500 | 400 | 3000 | 20,000 | 4 | 20 | 16.0 |
| 500 | 420 | 3000 | 40,000 | 3.4 | 46.5 | 17.0 |
| 550 | 400 | 3000 | 5,000 | 1.3 | 78 | 17.0 |
| 550 | 400 | 3000 | 3,560 | 1.1 | 82 | 17.0 |
| 550 | 400 | 3000 | 10,000 | 2.0 | 62.9 | 17.0 |
| 550 | 400 | 3000 | 20,000 | 3.5 | 53.9 | 17.0 |
| 550 | 400 | 3000 | 40,000 | 3.4 | 49.5 | 17.0 |
| 550 | 400 | 3000 | 60,000 | 6.0 | 50.2 | 17.0 |
| 600 | 380 | 2000 | 75,000 | 4.7 | 45.8 | *10 |
| 600 | 435 | 2000 | 75,000 | 2.7 | 49 | 16.6 |
| 950 | 400 | 3300 | 20,000 | 1.8 | 44.3 | 16.9 |
| 950 | 400 | 3300 | 40,000 | 2.5 | 41.6 | 16.9 |
| 950 | 430 | 3000 | 35,000 | 2.6 | 41.0 | 16.0 |

* Carbon dioxide replaced carbon monoxide in this test.

For the purpose of producing our improved catalysts we may employ, as a base material, any easily-reducible compound of nickel, for example the hydrate, oxide, nitrate, tartrate, or oxalate. The reduction may be carried out in the ordinary manner, known to those skilled in the art, which consists in heating granules of the nickel compound to the proper temperature in a current of hydrogen. The precise time required for reduction depends on the area of material exposed and the space velocity of the hydrogen. When reduction is completed it is preferable, though not necessary, that the reduced catalyst be allowed to cool down to room temperature in a hydrogen atmosphere. Once prepared, the catalyst is not damaged by exposure to air.

If desired the reduction may be accomplished in the synthetic methanol apparatus immediately prior to use.

When granules of a nickel compound are reduced within the temperature range 300–950° C. the reduced nickel catalyst is suitable for methanol production, as was shown in the above tabulation. Nickel thus reduced below 300° C. retains a powdery character and no particle fusion is noted. The catalytic activity of such material is so great that complete hydrogenation of carbon oxides is attained. Nickel reduced within the temperature range 300–950° C. is apparently in a state of incipient fusion such that it has just enough catalytic activity to carry the hydrogenation of carbon monoxide to the methanol stage. Nickel reduced above 950° C. is according to our belief so completely fused as to destroy the catalytic activity in methanol work.

Granules of nickel compound suitable for reduction may be prepared by moistening the powdered or crystalline compound with water, compressing the moist mass into tablet form, and permitting it to dry slowly. In place of pure water, a dilute aqueous solution of an agglutinating substance such as dextrine may be employed, and better granules thus obtained.

Nickel hydrate in pure form and in dense granules highly suitable for reduction and subsequent use as a catalyst may be prepared in the following manner:—

A solution of nickel nitrate

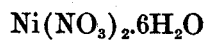

$$Ni(NO_3)_2.6H_2O$$

or similar soluble nickel salt is made up in distilled water to a concentration of about 1%. This solution is heated to 95–100° C. and is then treated with sufficient ammonium hydroxide to just render it alkaline, as indicated by "brilliant yellow" indicator paper.

The precipitate thus formed is allowed to settle and the supernatant liquor is removed by siphoning or decantation. The precipitated nickel hydroxide is separated in any convenient manner, for example by centrifuging, and is washed with about five times its volume of distilled water. The precipitate is again separated, and on account of its voluminous character the final separation from the wash water is most conveniently done with a centrifuge. The moist precipitate is then spread out on plates in layers about 1 cm. in thickness and dried at 100–105° C. for about 10–15 hours. The precipitate forms hard dense cakes during the drying period, and is subsequently broken up into granules of a size suitable for catalytic use.

It is understood however, that the specific example of the method of preparing nickel hydrate for reduction and subsequent use as a methanol catalyst is illustrative merely. Other nickel compounds may be used as the basis of a reduced nickel catalyst as was disclosed in a prior section of this specification.

While in the above tabulation of the results obtained in the production of synthetic methanol with our nickel catalysts, the reaction temperatures employed vary from 380–430° C., it should be understood that these catalysts are operative throughout the entire operative range of reaction temperature for synthetic methanol production—that is 250–450° C.

Now having described our invention, we claim the following as new and novel:—

1. A process for the production of synthetic methanol which comprises passing a mixture of hydrogen and carbon oxides at a pressure in excess of 50 atmospheres and at a temperature of 250–450° C. over a catalyst containing nickel reduced at a temperature of 300–950° C.

2. A process for the production of synthetic methanol which comprises passing a mixture of hydrogen and carbon oxides at a pressure in excess of 50 atmospheres and at a temperature of 250–450° C. over a catalyst containing nickel reduced at a temperature of 500–600° C.

3. A process for the production of synthetic methanol which comprises passing a mixture of hydrogen and carbon oxides at a pressure in excess of 50 atmospheres and at a temperature of 380–430° C. over a catalyst containing nickel reduced at a temperature of 500–600° C.

In testimony whereof we affix our signatures.

JOHN C. WOODRUFF.
GROVER BLOOMFIELD.
WILLIAM J. BANNISTER.